United States Patent
Chattopadhyay et al.

(10) Patent No.: US 8,924,426 B2
(45) Date of Patent: Dec. 30, 2014

(54) JOINING TABLES IN A MAPREDUCE PROCEDURE

(75) Inventors: Biswapesh Chattopadhyay, Sunnyvale, CA (US); Liang Lin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 585 days.

(21) Appl. No.: 13/209,567

(22) Filed: Aug. 15, 2011

(65) Prior Publication Data

US 2012/0278323 A1 Nov. 1, 2012

Related U.S. Application Data

(60) Provisional application No. 61/480,563, filed on Apr. 29, 2011.

(51) Int. Cl.
*G06F 17/00* (2006.01)
*G06F 17/30* (2006.01)
*G06F 9/50* (2006.01)

(52) U.S. Cl.
CPC .... *G06F 17/30592* (2013.01); *G06F 17/30545* (2013.01); *G06F 9/5066* (2013.01); *G06F 17/30584* (2013.01); *G06F 17/30445* (2013.01)
USPC .......................................... 707/793; 707/737

(58) Field of Classification Search
CPC .................... G06F 17/30584; G06F 17/30545; G06F 9/5066
USPC ................................................. 707/737, 793
See application file for complete search history.

(56) References Cited

U.S. PATENT DOCUMENTS

| | | | |
|---|---|---|---|
| 5,797,000 A * | 8/1998 | Bhattacharya et al. | 707/764 |
| 6,609,131 B1 | 8/2003 | Zait et al. | |
| 7,650,331 B1 | 1/2010 | Dean et al. | |
| 2005/0038784 A1 * | 2/2005 | Zait et al. | 707/5 |
| 2005/0187977 A1 | 8/2005 | Frost | |
| 2006/0218123 A1 * | 9/2006 | Chowdhuri et al. | 707/2 |
| 2010/0005080 A1 | 1/2010 | Pike et al. | |
| 2010/0122065 A1 | 5/2010 | Dean et al. | |
| 2011/0302151 A1 * | 12/2011 | Abadi et al. | 707/714 |
| 2011/0302583 A1 | 12/2011 | Abadi et al. | |

OTHER PUBLICATIONS

Bara et al. "Improving query performance in virtual data warehouses,"*WSEAS Transactions on Information Science and Applications*, 2008 World Scientific and Enginerring Academy and Society, 2008, 5(5):632-641.

(Continued)

*Primary Examiner* — Charles Lu
(74) *Attorney, Agent, or Firm* — Fish & Richardson P.C.

(57) ABSTRACT

Systems and techniques by which tables can be joined in a mapreduce procedure. In some implementations, when a large table of business data (e.g., having one billion transaction records or more) is to be joined with a large table of customer data (e.g., having hundreds of millions of customer records), then these two tables can be organized before the mapreduce procedure to speed up the table join. For example, the business data and the customer data can both be hash partitioned, based on the same key, into shards of business data and shards of customer data, respectively. The number of shards in these two groups has an integer relationship with each other: for example such that there are two business data shards for every customer data shard, or vice versa.

11 Claims, 4 Drawing Sheets

(56) References Cited

OTHER PUBLICATIONS

Chattopadhyay et al. "Tenzing a SQL Implementation on the MapReduce Framework," The 37th International Conference on Very Large Data Bases, *Proceedings of the VLDB Endowment*, 2011,. 4(12):1318-1327

Chen. "Cheetah: a high performance, custom data warehouse on top of MapReduce," *Proceedings of the VLDB Endowment*, 2010, 3(1-2):1459-1468

Jiang et al. "Optimization of multi-join query processing within MapReduce," Universal Communication Symposium (IUCS), 2010 4th International, 2010, pp. 77-83.

Lammel. "Google's MapReduce Programming Mode—Revisited," *Science of Computer Programming*, 2007, 70(1):1-30 .

Yang and Dasdan. "Map-Reduce-Merge: Simplified Relational Data Processing on Large Clusters," SIGMOD' 07, ACM, 2007, pp. 1029-1040.

Authorized Officer C. Dumitrescu. International Search Report and Written Opinion in International Application No. PCT/US2012/030897, mailed Jun. 19, 2012, 12 pages.

Authorized Officer C. Dumitrescu. International Search Report and Written Opinion in International Application No. PCT/US2012/030941, mailed Jul. 10, 2012, 15 pages.

International Preliminary Report on Patentability in International Application No. PCT/US2012/030897, mailed Oct. 1, 2013, 7 pages.

"Appengine-mapreduce" [online]. Google, Aug. 2010, [retrieved on Jul. 1, 2011]. Retrieved from the Internet: <URL: http://code.google.com/p/appengine-mapreduce/issues/detail?id-49>. 3 pages.

Dean and Ghemawat, "MapReduce: Simplified Data Processing on Large Clusters." Google, Inc., 2004, 13 pages.

Fokkinga, "MapReduce—a two-page explanation for laymen." Dec. 5, 2008, 2 pages.

Ghemawat et al. "The Google File System." Google, Inc., 2003, 15 pages.

McFadyen , "Data Warehousing." ACS-3902, 2010, 22 pages.

Pavlo et al. "A Comparison of Approaches to Large-Scale Data Analysis." 2009, 14 pages.

"Performance of DB2 Information Integrator in a J2EE Environment with Multiple Data Sources" [online] DeveloperWorks, IBM, 2003, [retrieved on Jul. 1, 2011]. Retrieved from the Internet:<URL: http://www.ibm.com/developerworks/data/library/techarticle/0306saraccol/0306saraccol.html>. 16 pages.

"Sort-merge join" [online]. Wikipedia, The Free Encyclopedia 2010, [retrieved on Jul. 1, 2011]. Retrieved from the Internet: <URL: http://en.wikipedia.org/wiki/Merge_join>. 4 pages.

"—Thanks for the question regarding "hash partitioning", version 8.1.7" [online]. Oracle, Ask Tom, 2001, [retrieved on Jul. 1, 2011]. Retrieved from the Internet: <URL: http://asktom.oracle.com/pls/asktom/f?p=100:11:0::::P11_QUESTION_ID:981835183841>. 21 pages.

\* cited by examiner

JOINING TABLES IN A MAPREDUCE PROCEDURE

CROSS REFERENCE TO RELATED APPLICATION

This application claims priority to U.S. Provisional Application Ser. No. 61/480,563, filed on Apr. 29, 2011, entitled "Joining Tables in a Mapreduce Procedure," the entire contents of which are hereby incorporated by reference.

TECHNICAL FIELD

This disclosure relates to joining tables in a mapreduce procedure.

BACKGROUND

The MapReduce model was developed at Google Inc. as a way to simplify large-scale data processing. Implementations of a mapreduce procedure are done according to the MapReduce model.

SUMMARY

Implementations can provide any or all of the following advantages. Data processing in a mapreduce framework can be done faster. The amount of data to be loaded for a mapreduce procedure can be reduced. Table join in a mapreduce procedure can be performed without further partitioning of the data. Fewer MapReduce operations may be necessary, leading to less resource usage. A join procedure in a mapreduce framework can be performed either with the entire data loaded into memory, or as a merge join on two sets of sorted data.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which tables can be joined in a mapreduce procedure. In some implementations, when a large table of business data (e.g., having one billion transaction records or more) is to be joined with a large table of customer data (e.g., having hundreds of millions of customer records), then these two tables can be organized before the mapreduce procedure to speed up the table join. For example, the business data and the customer data can both be hash partitioned, based on the same key, into shards of business data and shards of customer data, respectively. The number of shards in these two groups has an integer relationship with each other: for example such that there are two business data shards for every customer data shard, or vice versa. This pre-organization can reduce the amounts of data that are loaded into memory, and can also avoid some partitioning within the mapreduce procedure.

Figure 1:
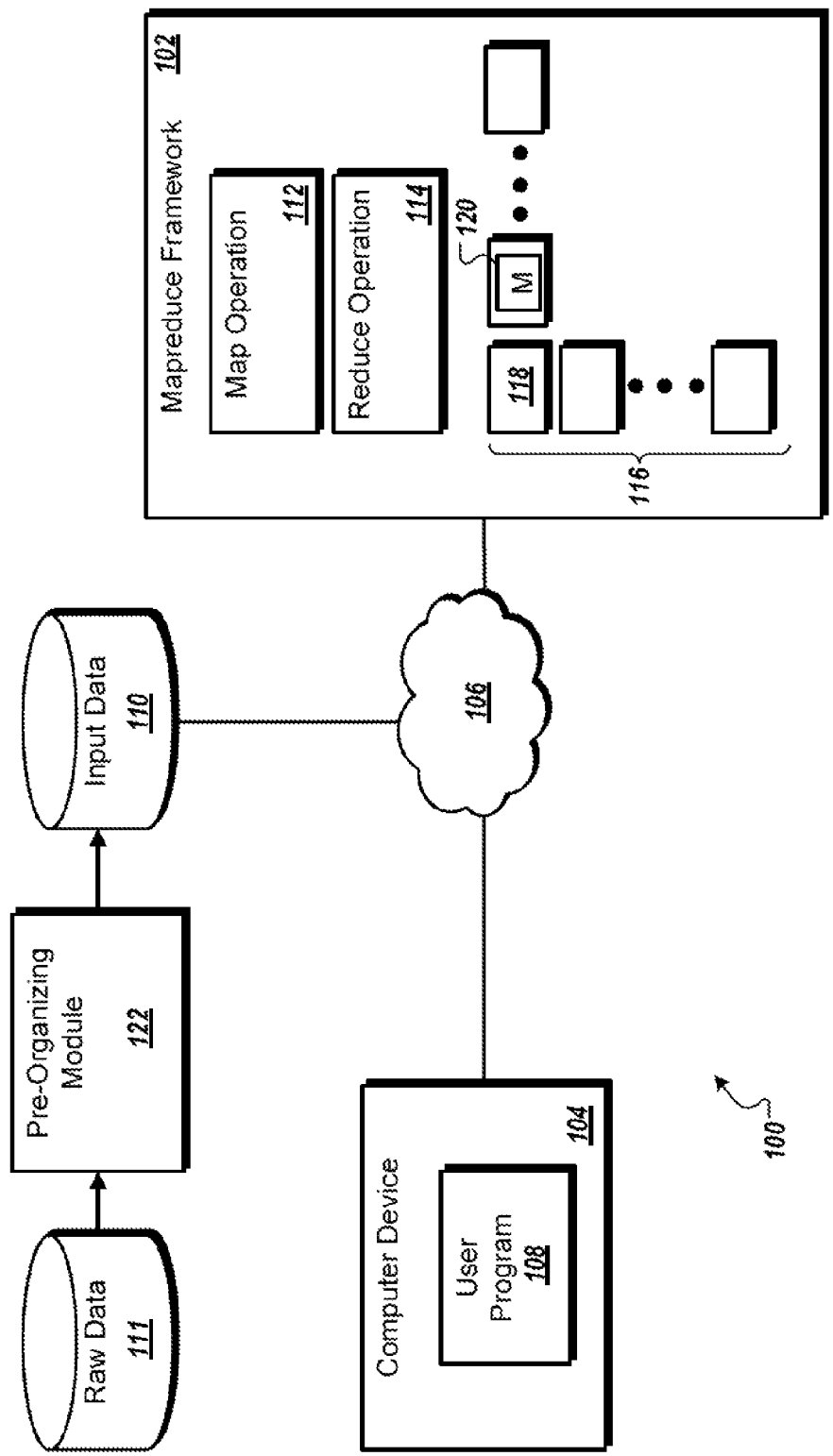
FIG. 1 is a block diagram schematically showing an example of partitioning for a mapreduce procedure.

FIG. 1 shows an example of a system 100 with a mapreduce framework 102. The mapreduce framework 102 can be used to perform data processing according to the mapreduce model, for example to perform certain types of analysis on large volumes of data. As used in this document, the term "mapreduce framework" refers to a system that is configured to perform (i) at least one map operation that generates one or more intermediate key/value pairs from input data; and (ii) at least one reduce operation that generates one or more output values from the intermediate key/value pairs.

The mapreduce framework divides the map operation among multiple program components (sometimes called "workers") and assigns one or more map tasks to each worker. The mapreduce framework divides the reduce operation into reduce tasks and assigns them to workers. In some implementations, the mapreduce framework is run on a cluster of processing devices such as a network of commodity PCs. For example, a data center can be established that has racks with tens of thousands of processing modules (e.g., a processing module can be a commodity PC, or part thereof), and the mapreduce procedure can be performed as a massive data job distributed among the thousands (or more) processing units. A mapreduce job can involve mapping and reducing several terabytes of data or more, to name just one example.

Here, a user can employ a computer device 104 to access the mapreduce framework 102 through any type of network 106, such as the internet or a network for mobile devices (e.g., a cellular phone network). Mapreduce processing can be initiated by a user program 108 on the computer device. In some implementations, an organization can use the program 108 to analyze volumes of business data. For example, a telecommunications company (such as a wireless service provider) can have hundreds of millions of customers who engage in many transactions with the company (for example, each use of the wireless service can be registered as a transaction). In such situations, the cumulative business data for some period of time (e.g., a week, month or year) can reach a billion records or more. The mapreduce procedure can then be used in analyzing the business data, for example to count the number of transactions originating in a specific country, or the number of unsuccessful transactions. In such a situation, the user program 108 identifies the volume of business data to be used, and defines the criterion or characteristic that is being sought.

In some implementations, the user program 108 is configured so that the user can formulate one or more queries (e.g., using Structured Query Language (SQL)) to be performed on some or all of a collection of information stored as input data 110. The input data can include any suitable information that can be processed in the mapreduce framework 102. In some implementations, some or all of the input data 110 corresponds to data gathered by an advertisement-serving organization, such as by logging online requests of associated users, by registering queries entered into a search engine, and/or by automatically crawling pages available on the internet. For example, and without limitation, the input data 110 can correspond to network data, sales data, observational data, scientific data, random data, population data, artistic data, statistical data, and combinations thereof. Examples are described below of obtaining the input data 110 through pre-organization of other information, such as raw data 111.

For situations in which the systems discussed here rely on personal information (e.g., query history) about users, the users may be provided with an opportunity to opt in/out of programs or features that may collect the personal information. In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user. As another example, user queries stored in query logs may be deleted after a predetermined period of time.

The input data 110 and the raw data 111 can have any data format that is suitable for the mapreduce operations, including, but not limited to, a binary data format, a plain text format, a markup-language format (e.g., XML), or an image format.

The mapreduce framework 102 includes a map operation 112 and a reduce operation 114. In some implementations, the map operation 112 is configured for processing some or all of the input data 110 and generating at least one intermediate key/value pair therefrom. In some implementations, the reduce operation 114 is configured for processing at least part of the intermediate key/value pair(s) and generating at least one output value therefrom. In general, the map operation 112 can detect the occurrences, in the input data 110, of each of multiple keys, and the reduce operation 114 can sum or otherwise aggregate data from such detections into useful output information (e.g., a table of occurrence frequencies).

The map operation 112 and/or the reduce operation 114 can be performed as tasks distributed to one or more processors. In some implementations, the mapreduce framework 102 includes, or otherwise works in connection with, a cluster 116 of processing units, such as machines 118. For example, each machine 118 can be a commodity device (e.g., a PC) and they can be networked using any suitable communication protocol (e.g., Ethernet). Each of the machines 118 has at least one memory 120, either integrated in the device or communicatively coupled thereto by an appropriate connection (e.g., a system bus). For example, the memory 120 is used in detecting occurrences of keys in the input data 110, and/or in summing data for generating the output information.

The system 100 here includes a pre-organizing module 122 that performs one or more pre-organizing actions to pre-organize data, such as for subsequent mapreduce operations. In some implementations, it can commonly occur that certain types of large tables are to be joined as part of a mapreduce operation. Such tables can be part of the raw data 111 or can be stored elsewhere. In a particular example, as part of the mapreduce operation a transactional table of over a billion records (sometimes called a "fact table") is to be joined with a customer table of hundreds of millions of records (sometimes called a dimension table). In short, some or all of the raw data 111 can be provided to the pre-organizing module 122, which in turn generates some or all of the input data 110 as a result of the pre-organization. The term input data here signifies that the data can be used as input for a mapreduce procedure.

Figure 2:
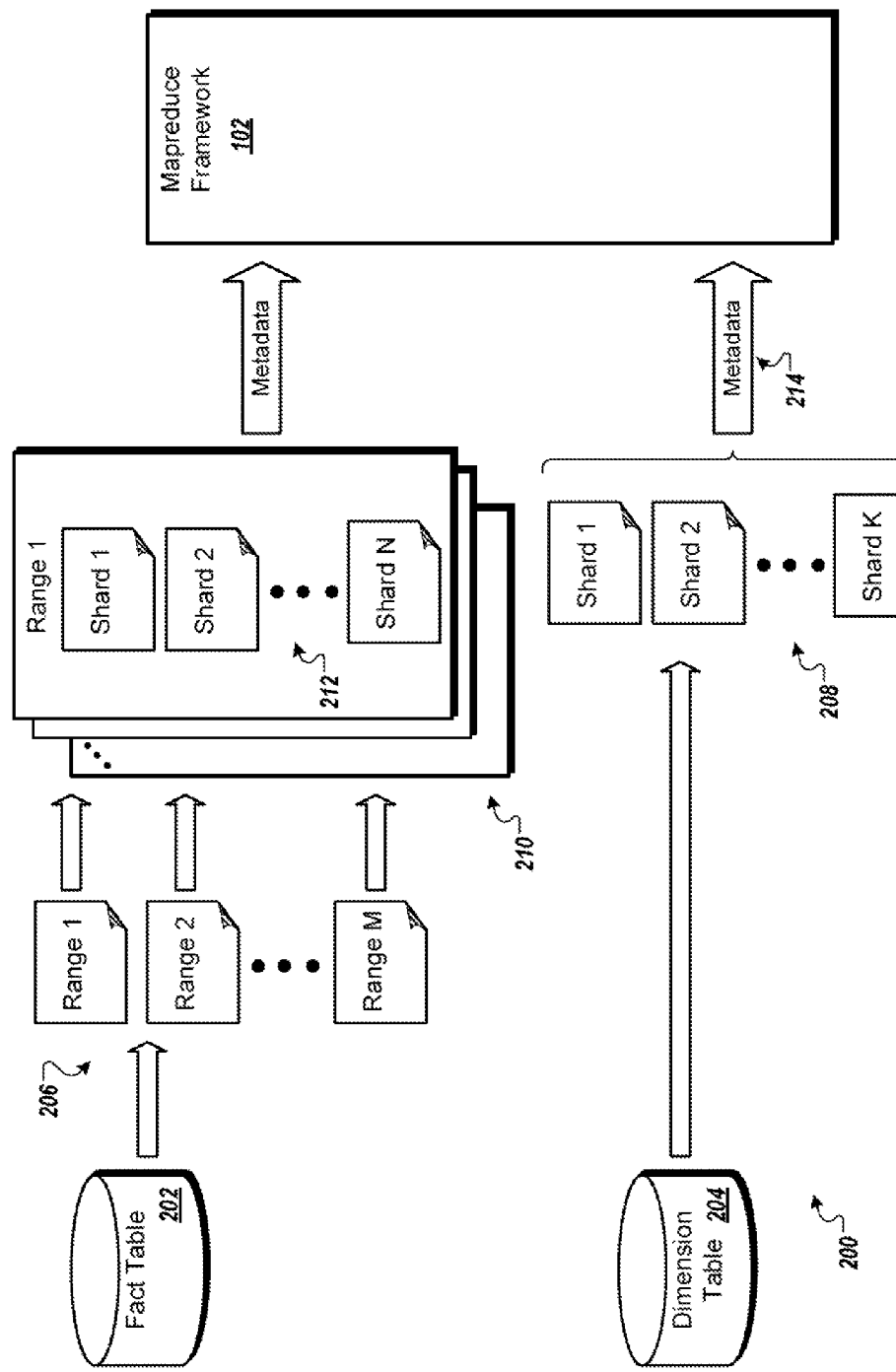
FIG. 2 schematically illustrates an example of pre-organizing data from a first and second tables.

An example of such pre-organization will now be described with reference also to FIG. 2, which schematically illustrates an example 200 of pre-organizing data from a first table 202 and a second table 204. Here, the first table 202 is labeled fact table and can contain the one billion or more transaction records, for example. Similarly, the second table 204 is here labeled dimension data and can contain the hundreds of millions or more customer records, for example. The join between these tables is to be performed on a specific key (e.g., customer ID) which occurs in both tables. However, at this point in the example 200, the first table 202 and the second table 204 have not been pre-organized.

The pre-organization can be done by the pre-organizing module 122 (FIG. 1), for example as follows. The fact table 202 is partitioned in different ranges based on some key other than the join key. In some implementations, this partitioning can be done on a date key or any other time related key. For example, a year's worth of transaction data can be divided into twelve range partitions, one for each month. Here, the fact table is partitioned into M number of range partitions 206. That is, in the example with month-by-month partitioning, each of the range partitions 206 would contain transaction records relating to a specific month.

The dimension table 204 is hash partitioned on the join key. In some implementations, the join key is chosen as the partitioning key because it is expected that a join will be performed between the fact table and dimension table. For example, customer records can be hash partitioned using a customer ID key in situations where that key is expected to later be used in joining the tables. Here, the dimension table 204 is partitioned into K number of hash shards 208. That is, in the example with customer records, each of the hash shards 208 would contain transaction records relating to a specific group of customer IDs.

In some implementations, modulo (i.e., a mod b, where a and b are positive numbers) can be used in hash partitioning. For example, assume that it is desired to have 250 hash partitions in the dimension data (i.e., to have K=1000). Then a unique value from each dimension data record is chosen (e.g., the customer ID) and modulo is performed on the customer ID with regard to 250, in this example. The result for each dimension data record (i.e., the remainder when the customer ID is divided by 250) can be used to assign that particular dimension data record to one of the 250 hash partitions.

Each of the range partitions 206 is also hash partitioned on the join key. This generates M number of sharded range partitions 210. In this example, the shards for the first sharded range partition (i.e., for "Range 1") are shown. That is, the fact data of the first range partition of the range partitions 206 is divided among N number of hash shards 212, and so on for all the M sharded range partitions 210.

The numbers K, M and N are integers. Moreover, the numbers K and N are selected so that one of K and N is an integer multiple of the other. That is, if the dimension data (e.g., customer records) is sharded K ways on a particular key, then the fact data can be sharded N=I*K ways, where I=1, 2, . . . . Because the hash shards 208 and the hash shards 212 are based on the same key (e.g., customer ID), the integer-multiple relationship establishes a correspondence between the hash shards 208 and 212. For example, if there are 500 of the hash shards 212 in the fact data, and there are 250 of the hash shards 208 in the dimension data, then a 2:1 correspondence exists. That is, for any arbitrary one of the 250 hash shards 208, it is known, due to the common-key hashing and the relationship between the integers, that the corresponding fact records (e.g., the fact records having the customer IDs occurring in that particular hash shard 208) are located in exactly two of the 500 hash shards 212.

Stated somewhat differently, for any arbitrary one of the 500 hash shards 212 it is known that the corresponding dimension data records are located in exactly one of the 250 hash shards 208. For this reason, a join involving the transaction records of the particular hash shard 212 need not have access to all of the 250 hash shards 208. Rather, such a join can be performed as long as at least the single corresponding hash shard 212 is available. In other words, the join operation for this transaction hash shard requires loading of only a fraction of the records from the dimension data table; and that fraction of dimension data is known to be located in a particular one of the hash shards 208.

In one or more operations 214, metadata about the sharded range partitions 210 and about the hash partitions 208 are provided to the mapreduce framework 102. That is, such metadata is available when subsequent mapreduce operations are to be performed. For example, the metadata can contain the information that the fact table 202 is range sharded on a first key into the M number of range partitions 206; that each of the range partitions 206 is hash partitioned on a second key into the N number of hash shards 212; and that the dimension table 204 is hash partitioned on the second key into the K number of hash shards 208.

Figure 3:
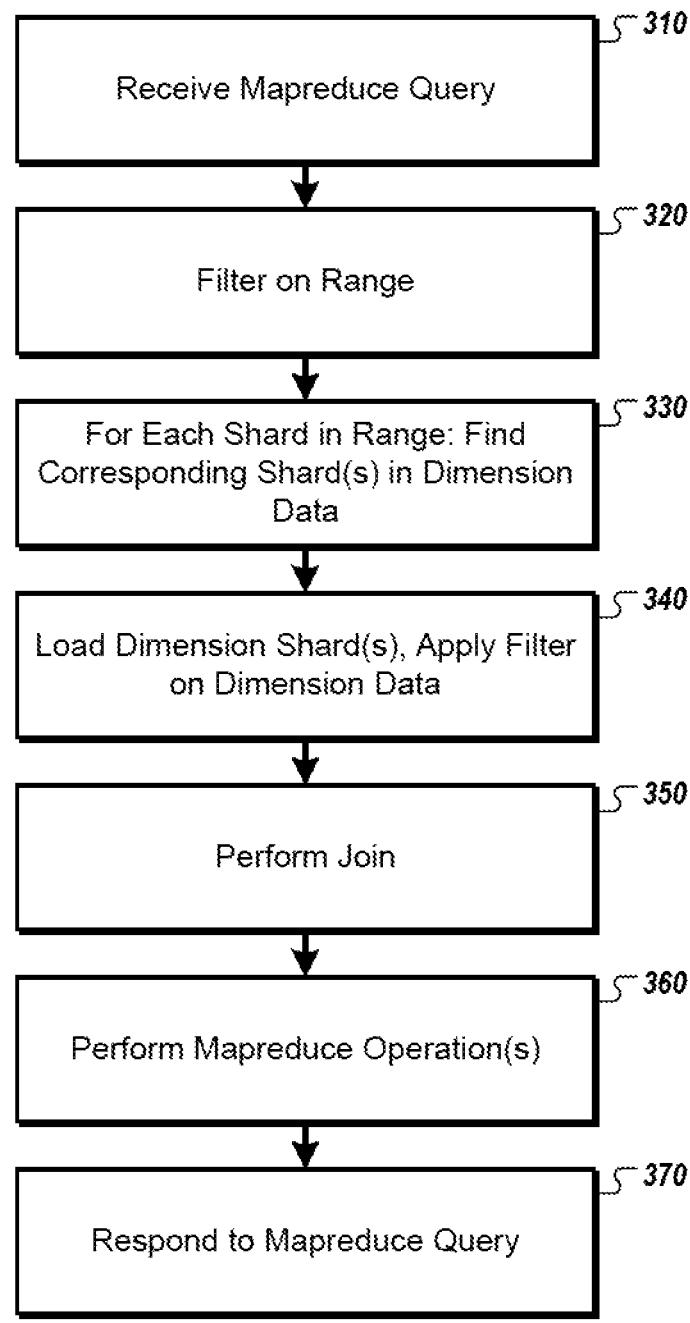
FIG. 3 is a flowchart with an example of performing a mapreduce operation.

FIG. 3 is a flowchart 300 with an example of performing a mapreduce operation. Operations can be implemented as computer-readable code stored on a tangible computer-readable medium, for execution by one or more processors, for example in the system 100 (FIG. 1).

At 310, a mapreduce query is received. For example, such a query can be generated to initiate a large-scale data processing job. Corresponding data—e.g., the fact table 202 (FIG. 2) and/or the dimension table 204 (FIG. 2)—are also received, or may have been loaded or stored earlier.

At 320, the fact table is filtered on a range of values for a first key. For example, the range partition having all transactions for April can be loaded based on the mapreduce query, and the other range partitions can be ignored for purposes of this mapreduce query.

At 330-350, operations are performed for each hash shard in the relevant range partition(s). At 330, a corresponding hash shard in the dimension data is found. For example, the hash shard is identified based on knowing that the number of fact data hash shards are a certain integer multiple of the number of dimension data hash shards.

At 340, the identified dimension data shard is loaded into memory. For example, in the distribution of map operations among machines in the cluster 116 (FIG. 1), the identified data shard can be assigned to a particular map operation on one of the machines which loads the dimension data shard into its local memory. In so doing, a filtering operation can be performed. For example, if the dimension data contains customer records and only customers based in a specific country are relevant for the query, then the filtering provides that only the specific country's customer records from the identified dimension data shard are loaded into the memory. Such filtering can make the loading faster and/or reduce the need for memory capacity.

At 350, the join is performed. If the dimension data fits in the available memory (i.e., taking into account the total available free memory), then the data is loaded into the memory in a hash table, and the join is performed by streaming the fact data and looking up each entry. On the other hand, if the fact data shard does not fit all at once in the memory, then the join is performed in another way. For example, if both fact and dimension shards are sorted on the join key, two pointers on input and join datasets can be opened, and a merge join can be performed. Otherwise, an on-disk structure (such as a B-Tree) can be created with the dimension data and lookups issued to this structure while streaming the fact data. In this case, often, a LRU cache is used to reduce disk access.

At 360, one or more mapreduce operations are performed. In some implementations, each local mapper can process the data available from the join and generate one or more intermediate key/value pairs from the data, and in subsequent reduce operations the values from these pairs can be merged, aggregated or otherwise associated with each other to generate one or more meaningful output values. For example, when the map operation pairs customer name with sales amount for each transaction relevant to the mapreduce query, the reduce operation can sum those sales amounts on a customer-by-customer basis and generate an overall sales list.

At 370, a response to the mapreduce query is generated. In some implementations, one or more relevant outputs of the mapreduce procedure are identified and stored. For example, a report can be displayed, printed, read audibly and/or stored.

In some implementations, some operations in the flowchart 300 can be performed in a different order.

Figure 4:
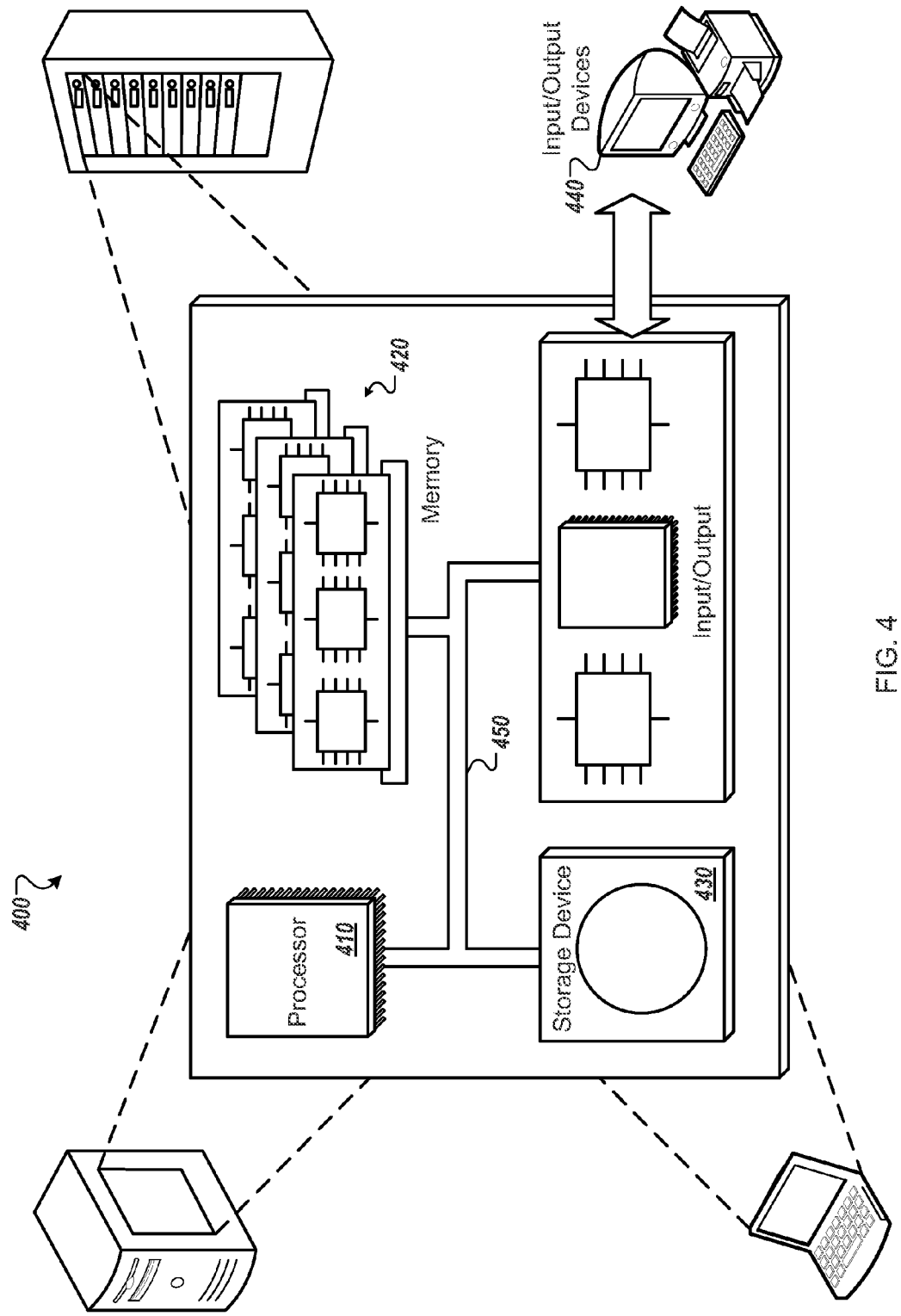
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for performing a mapreduce query, the method comprising:
receiving, at a computer system, a mapreduce query that requires first and second tables to be joined, the first table having range partitions based on a first key;
identifying, with a computer system, at least one of the range partitions as relevant to the mapreduce query, the range partition having a first number of hash partitions based on a second key, wherein the second table has a second number of hash partitions based on the second key, one of the first and second numbers being an integer multiple of the other and the first and second number being different than each other;
for each one of the first number of hash partitions:
identifying, based on the first and second numbers, at least one corresponding hash partition from the second number of hash partitions;
loading at least part of the identified corresponding hash partition into memory; and
joining the one of the first number of hash partitions and the identified corresponding hash partition; and
generating, using a computer system, a response to the mapreduce query using the joined hash partitions.

2. The computer-implemented method of claim 1, wherein the mapreduce query specifies at least one limitation for data in the second table, the method further comprising applying a filter so that only the part of the identified corresponding hash partition is loaded into the memory.

3. The computer-implemented method of claim 1, wherein the first key is a date or time parameter, further comprising associating each of the range partitions with a date range or time range.

4. The computer-implemented method of claim 1, wherein the first data corresponds to business transactions and the second data is file records about participants in the business transactions.

5. The computer-implemented method of claim 4, wherein the second key is a customer identifier.

6. A computer program product tangibly embodied in a computer-readable storage medium and comprising instructions that when executed by a processor perform a method for performing a mapreduce query, the method comprising:
receiving a mapreduce query that requires first and second tables to be joined, the first table having range partitions based on a first key;
identifying at least one of the range partitions as relevant to the mapreduce query, the range partition having a first number of hash partitions based on a second key, wherein the second table has a second number of hash partitions based on the second key, one of the first and second numbers being an integer multiple of the other and the first and second number being different than each other;
for each one of the first number of hash partitions:
identifying, based on the first and second numbers, at least one corresponding hash partition from the second number of hash partitions;
loading at least part of the identified corresponding hash partition into memory; and
joining the one of the first number of hash partitions and the identified corresponding hash partition; and
generating a response to the mapreduce query using the joined hash partitions.

7. The computer program product of claim 6, wherein the mapreduce query specifies at least one limitation for data in the second table, the method further comprising applying a filter so that only the part of the identified corresponding hash partition is loaded into the memory.

8. The computer program product of claim 6, wherein the first key is a date or time parameter, the method further comprising associating each of the range partitions with a date range or time range.

9. The computer program product of claim 6, wherein the first data corresponds to business transactions and the second data is file records about participants in the business transactions.

10. The computer program product of claim 9, wherein the second key is a customer identifier.

11. A computer system comprising:
a processor; and a computer-readable storage medium having stored therein instructions that when executed by the processor perform a method for joining first and second tables in a mapreduce procedure, the method comprising:

receiving a mapreduce query that requires first and second tables to be joined, the first table having range partitions based on a first key;

identifying at least one of the range partitions as relevant to the mapreduce query, the range partition having a first number of hash partitions based on a second key, wherein the second table has a second number of hash partitions based on the second key, one of the first and second numbers being an integer multiple of the other and the first and second number being different than each other;

for each one of the first number of hash partitions:

identifying, based on the first and second numbers, at least one corresponding hash partition from the second number of hash partitions;

loading at least part of the identified corresponding hash partition into memory; and joining the one of the first number of hash partitions and the identified corresponding hash partition; and generating a response to the mapreduce query using the joined hash partitions.

\* \* \* \* \*